(12) United States Patent
Nishikawa

(10) Patent No.: US 7,643,744 B2
(45) Date of Patent: Jan. 5, 2010

(54) LENS DRIVING DEVICE AND IMAGE PICKUP DEVICE USING THE SAME

(75) Inventor: Masayuki Nishikawa, Higashiosaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 374 days.

(21) Appl. No.: 11/603,465

(22) Filed: Nov. 22, 2006

(65) Prior Publication Data

US 2007/0133973 A1 Jun. 14, 2007

(30) Foreign Application Priority Data

Nov. 24, 2005 (JP) .............................. 2005-338016

(51) Int. Cl.
*G03B 3/10* (2006.01)
*G03B 13/34* (2006.01)

(52) U.S. Cl. ..................... 396/133; 359/823; 348/357; 396/87

(58) Field of Classification Search ......... 396/133–136; 348/357; 359/823
See application file for complete search history.

(56) References Cited

U.S. PATENT DOCUMENTS

| 5,241,422 A | * | 8/1993 | Shimada et al. ............. 359/694 |
| 5,255,035 A | * | 10/1993 | Kichima ...................... 396/133 |
| 5,392,159 A | * | 2/1995 | Sasaki et al. ................ 359/691 |
| 5,614,982 A | * | 3/1997 | Yasukawa .................... 396/95 |
| 5,854,711 A | | 12/1998 | Kaneda |
| 6,317,562 B1 | * | 11/2001 | Aoshima ...................... 396/72 |
| 6,707,194 B2 | * | 3/2004 | Tanaka .......................... 310/83 |
| 6,762,888 B1 | * | 7/2004 | Oshima ........................ 359/696 |
| 7,295,390 B2 | * | 11/2007 | Miki ............................ 359/824 |

| 2001/0028512 A1 | * | 10/2001 | Noguchi ...................... 359/694 |
| 2004/0165876 A1 | | 8/2004 | Yasuda |
| 2005/0111112 A1 | * | 5/2005 | Masuda ....................... 359/696 |
| 2005/0168834 A1 | | 8/2005 | Matsumoto et al. |

FOREIGN PATENT DOCUMENTS

| JP | 08-220414 | 8/1996 |
| JP | 11-167059 | 6/1999 |
| JP | 2001-124974 | 5/2001 |
| JP | 2002-131611 | 5/2002 |

(Continued)

*Primary Examiner*—W. B. Perkey
*Assistant Examiner*—Leon W Rhodes
(74) *Attorney, Agent, or Firm*—Edwards Angell Palmer & Dodge LLP; David G. Conlin; David A. Tucker

(57) ABSTRACT

A lens driving device has first and second driving units for moving first and second lens holders supporting first and second sets of lens elements in an optical axis direction, respectively. The first and second driving units each have a motor, a gear fitted around an output shaft of the motor, a lead screw rotated by the gear, and a nut fitted around the lead screw. The output shafts of the first and second motors overlap each other in their axial direction. The first and second driving units move the first and second lens holders in the optical axis direction via the respective nuts moving in the optical axis direction. An image pickup plane side end face of the motor of the first driving unit is positioned more to the image pickup plane side than a position most to the subject side of the second lens holder is.

5 Claims, 13 Drawing Sheets

FOREIGN PATENT DOCUMENTS

| | | |
|---|---|---|
| JP | 2004-133054 A | 4/2004 |
| JP | 2004-258195 A | 9/2004 |
| JP | 2004-293681 A | 10/2004 |
| JP | 2005-017981 A | 1/2005 |
| JP | 2005-234101 A | 9/2005 |

* cited by examiner

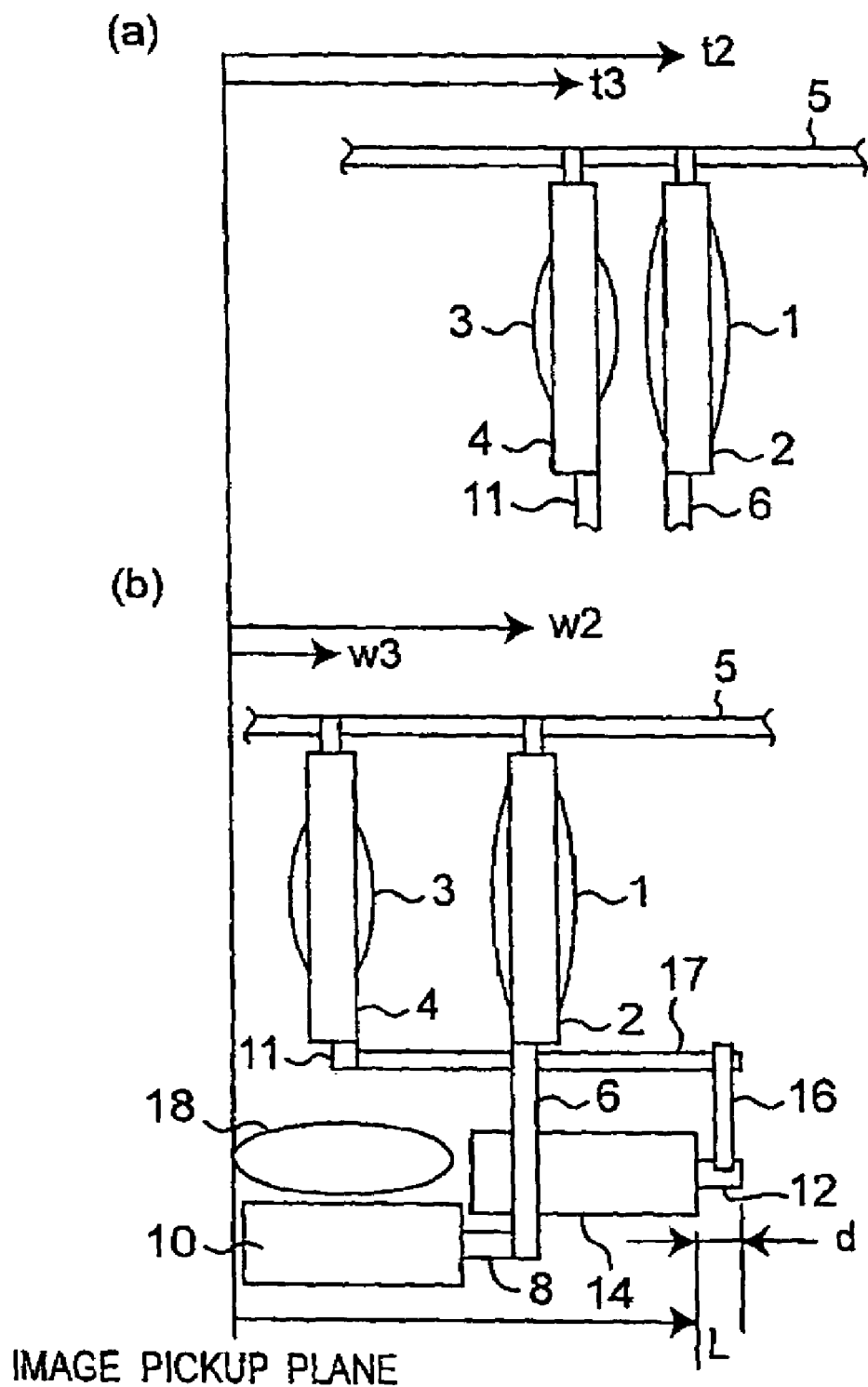

LENS DRIVING DEVICE AND IMAGE PICKUP DEVICE USING THE SAME

This nonprovisional application claims priority under 35 U.S.C. §119(a) on Patent Application No. 2005-338016 filed in Japan on Nov. 24, 2005, the entire contents of which are hereby incorporated by reference.

BACKGROUND OF THE INVENTION

The present invention relates to a lens driving device and an image pickup device using it.

Conventionally, various lens driving mechanisms for driving two or more sets of lens elements of, for example, a zoom lens in the direction of an optical axis of the lens by an actuator have been proposed. FIG. 14 is a schematic perspective view of a conventional lens driving mechanism (see Japanese Unexamined Patent Publication No. 2002-131611) for driving two or more sets of lens elements. In the figure, +Z side is the image pickup element side, and −Z side is the subject side.

In the lens driving mechanism shown in FIG. 14, a first lens holder 2 holding a first set of lens elements 1 and a second lens holder 4 holding a second set of lens elements 3 are guided by a guide shaft 5 to be moved in the direction of the optical axis (Z-axis). On a diagonally upper part of the first lens holder 2 there is provided an upper protrusion 6, with which a driving shaft 8 is brought into sliding contact by the elastic force of a plate spring 7. One end of the driving shaft 8 is fixed to a pedestal 9. The driving shaft 8 is driven to move relative to the pedestal 9 in the optical axis direction by a piezoelectric device 10. The second lens holder 4 is also provided with an upper protrusion 11 on a diagonally upper part of it. The upper protrusion 11 has sliding contact with a driving shaft 12, one end of which is fixed to a pedestal 13. The driving shaft 12 is driven to move in the optical axis direction relative to the pedestal 13 by a piezoelectric device 14.

More specifically, the first set of lens elements 1 is driven to move along the driving shaft 8 and the guide shaft 5 by application of a voltage to the piezoelectric device 10, and the second set of lens elements 2 is driven to move along the driving shaft 12 and the guide shaft 5 by application of a voltage to the piezoelectric device 14. The piezoelectric device 10 and pedestal 9 for the first set of lens elements 1 are disposed on the second lens side (image pickup element (not shown) side) of the first set of lens elements 1 in the direction of the optical axis. Furthermore, the piezoelectric device 14 and pedestal 13 for the second set of lens elements 3 are disposed on the first lens side (subject side) of the second set of lens elements 3 in the direction of the optical axis.

The conventional lens driving mechanism has problems as described below. When a zoom camera module is mounted on small-sized portable equipment, it is necessary to reduce the length of the camera module in the optical direction. Reduction in the optical length requires size reduction in the driving mechanism, particularly reduction in the length of it in the direction of the optical axis.

FIG. 15 schematically shows arrangements of the driving system of FIG. 14. FIG. 15(a) shows an arrangement in the case that the first lens holder 2 holding the first set of lens elements 1 and the second lens holder 4 holding the second set of lens elements 3 are positioned most to the subject side. In contrast to this, FIG. 15(b) shows an arrangement in the case that the first lens holder 2 and the second lens holder 4 are positioned most to the image pickup element side.

In FIG. 15, the first lens holder 2 is moved between a position at a distance of w2 from an image pickup plane and a position at a distance of t2 from the image pickup plane. Furthermore, the second lens holder 4 is moved between a position at a distance of w3 from the image pickup plane and a position at a distance of t3 from the image pickup plane. In order to reduce the length of the camera module in the direction of the optical axis, it is necessary for the piezoelectric device 14 to be positioned as near the image pickup plane as possible. For this purpose, it is necessary that a distance X from the image pickup plane to the driving shaft 12 side end face of the piezoelectric device 14 is less than t3 and less than w2.

However, "t3" is the distance from the image pickup plane to the second lens holder 4 driven by the piezoelectric device 14 in the case that the second lens holder 4 is positioned most to the subject side. In addition, in order that the second lens holder 4 is driven to move to the position at the distance "t3", it is necessary for the piezoelectric device 14 to be positioned to the subject side more than the position at the distance "t3". Consequently, it is impossible that "X", which is the distance from the image pickup plane to the driving shaft 12 side end face of the piezoelectric device 14, is made smaller than "t3", and the length of the lens driving mechanism in the optical axis is large accordingly.

The piezoelectric device 10 transfers power to the upper protrusion 6 via the driving shaft 8 to drive the first lens holder 2 in the direction of the optical axis. Furthermore, the piezoelectric device 14 transfers power to the upper protrusion 11 via the driving shaft 12 to drive the second lens holder 4 in the direction of the optical axis. A space 15 near the image pickup plane is occupied by parts for driving the second lens holder 4 (see FIG. 14). Thus, it is difficult to locate in the space 15 electrical circuit components which are to be disposed near the image pickup plane and have heights in the direction of the optical axis.

FIG. 16 shows an arrangement in which the orientation of the piezoelectric device 14 and driving shaft 12 is opposite to the orientation of the piezoelectric device 14 and driving shaft 12 in FIG. 15. With this arrangement, it is possible that a space 18 near the image pickup plane corresponding to the space 15 in FIG. 15 is not occupied by anything. However, in this case, there is a problem that additional members 16 and 17 for transferring the power of the driving shaft 12 to the upper protrusion 11 are newly required and the whole length of the lens driving mechanism in the direction of the optical axis is larger than L in the case shown in FIG. 15 by the length d of the driving shaft 12.

SUMMARY OF THE INVENTION

It is therefore an object to provide a lens driving device which drives two sets of lens elements and has a short length in the direction of the optical axis, and an image pickup device using the lens driving device.

In order to give a solution to the above problems, there is provided, according to a present invention, a lens driving device, comprising:

a first lens holder for supporting a first set of lens elements;

a second lens holder for supporting a second set of lens elements which is disposed in a direction of an optical axis of the first set of lens elements and is positioned more to an image pickup plane side than the first set of lens elements is;

a first driving unit for driving the first lens holder in the direction of the optical axis; and a second driving unit for driving the second lens holder in the direction of the optical axis, wherein the first driving unit comprises:

a first motor disposed near the first set of lens elements and having an output shaft disposed in parallel with the optical axis of the first set of lens elements;

a first gear fitted around the output shaft of the first motor;

a first lead screw rotated by the first gear; and a first nut which is fitted around the first lead screw and is movable in the direction of the optical axis, the second driving unit comprises:

a second motor disposed near the second set of lens elements and having an output shaft disposed in parallel with the optical axis of the first set of lens elements;

a second gear fitted around the output shaft of the second motor;

a second lead screw rotated by the second gear; and a second nut which is fitted around the second lead screw and is movable in the direction of the optical axis, the output shaft of the first motor and the output shaft of the second motor overlap each other at least partially in an axial direction of the output shafts, the first driving unit is designed to move the first lens holder in the direction of the optical axis via the first nut moving in the direction of the optical axis, the second driving unit is designed to move the second lens holder in the direction of the optical axis via the second nut moving in the direction of the optical axis, and a position of an image pickup plane side end face of the first motor is more to the image pickup plane side than a position most to the subject side of the second lens holder is.

With the above configuration, the second nut for moving the second lens holder in the direction of the optical axis is moved in the direction of the optical axis by the second lead screw rotated by the second gear mounted to the second motor. Thus, by disposing the second lead screw in such a manner that it extends to the subject side beyond the position of the image pickup plane side end face of the first motor is, the image pickup plane side end face of the first motor can be positioned more to the image pickup plane side than the position most to the subject side of the second lens holder is.

As a result of this, the subject-side first driving unit is disposed closer to the image pickup plane, so that the length of the lens driving device in the direction of the optical axis can be reduced.

In one embodiment, the first driving unit is disposed more to a subject side than the second motor is, and parts of the second driving unit other than the second motor are disposed more to the subject side than the second motor is and on a lateral side of the second motor.

In this embodiment, there are no components of the first driving unit and second driving unit above the second motor. Thus, a space can be provided above the second motor, so that wiring to the terminals of the second motor becomes easy, thereby improving the assemblability of the lens driving device.

In one embodiment, the image pickup plane has a rectangular shape in outline. The first motor and the second motor each have a terminal base which is provided with terminals for supplying electric power. And, the terminal base of at least one of the first motor and the second motor has a top surface which is inclined relative to directions in which all of sides constituting the outline of the image pickup plane extend.

In this embodiment, the top surface of the terminal base of at least one of the first motor and the second motor is inclined relative to the directions (for example, directions of X-axis and Y-axis) in which the sides of the rectangular outline of the image pickup plane extend. Thus, wiring to the terminals of the terminal base becomes easy. In particular, in the case that wiring is performed using a FPC (flexible printed circuit board), when the FPC is inserted toward the terminal base in the direction of Y-axis, the degree of bend of an end portion of the FPC connected to the terminals becomes larger than 90 degrees. Thus, the bending stress of the FPC can be made smaller than in the case that the top surface of the terminal base is not inclined, in which case the degree of bend of the FPC is 90 degrees. Therefore, the assemblability and the long term reliability can be improved.

In one embodiment, the first motor and the second motor each have a terminal base which is provided with terminals for supplying electric power, and the terminals of the first motor and second motor extend in the same direction.

In this embodiment, due to the fact that the terminals of the first motor and second motor extend in the same direction, when, for example, a FPC for the first motor and a FPC for the second motor are inserted in the same direction, a total length of the two FPCs can be smaller, as compared with that in the case that the terminals of both of the terminal bases are directed in different directions. In addition, wiring can be performed from the same direction, thereby improving the workability during assemble.

An image pickup device according to the present invention includes the lens driving device as described above.

That is, this image pickup device uses a lens driving device the length of which in the direction of the optical axis can be reduced. Thus, the whole length of the image pickup device in the direction of the optical axis can be reduced. In addition, if a lens driving device which may have a space above the second motor is used, heat generated from an image sensor mounted in the image pickup device or the second motor can be dissipated through the space, which increases the flexibility in the design of equipment to be installed.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 16 shows the arrangement in which the orientation of a piezoelectric device is opposite to that in FIG. 15.

DETAILED DESCRIPTION OF THE INVENTION

Figure 1:
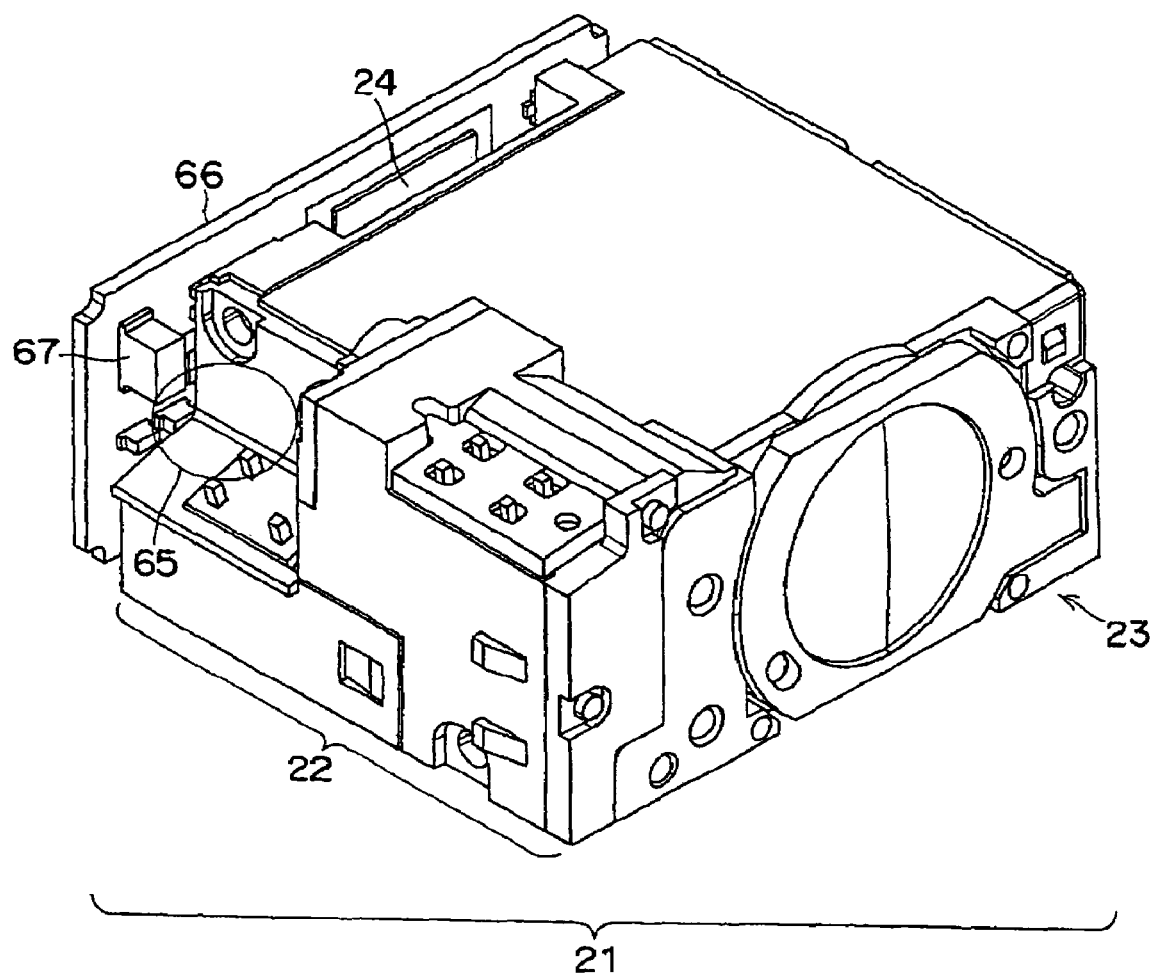
FIG. 1 is a perspective view of an image pickup device carrying a lens driving device according to the present invention.

The present invention will be described in detail below with reference to an embodiment shown in the figures. FIG. 1 is a perspective view of an image pickup device mounted with a lens driving device of this embodiment. The lens driving device of this embodiment drives a zoom lens and a focus lens.

Figure 2:
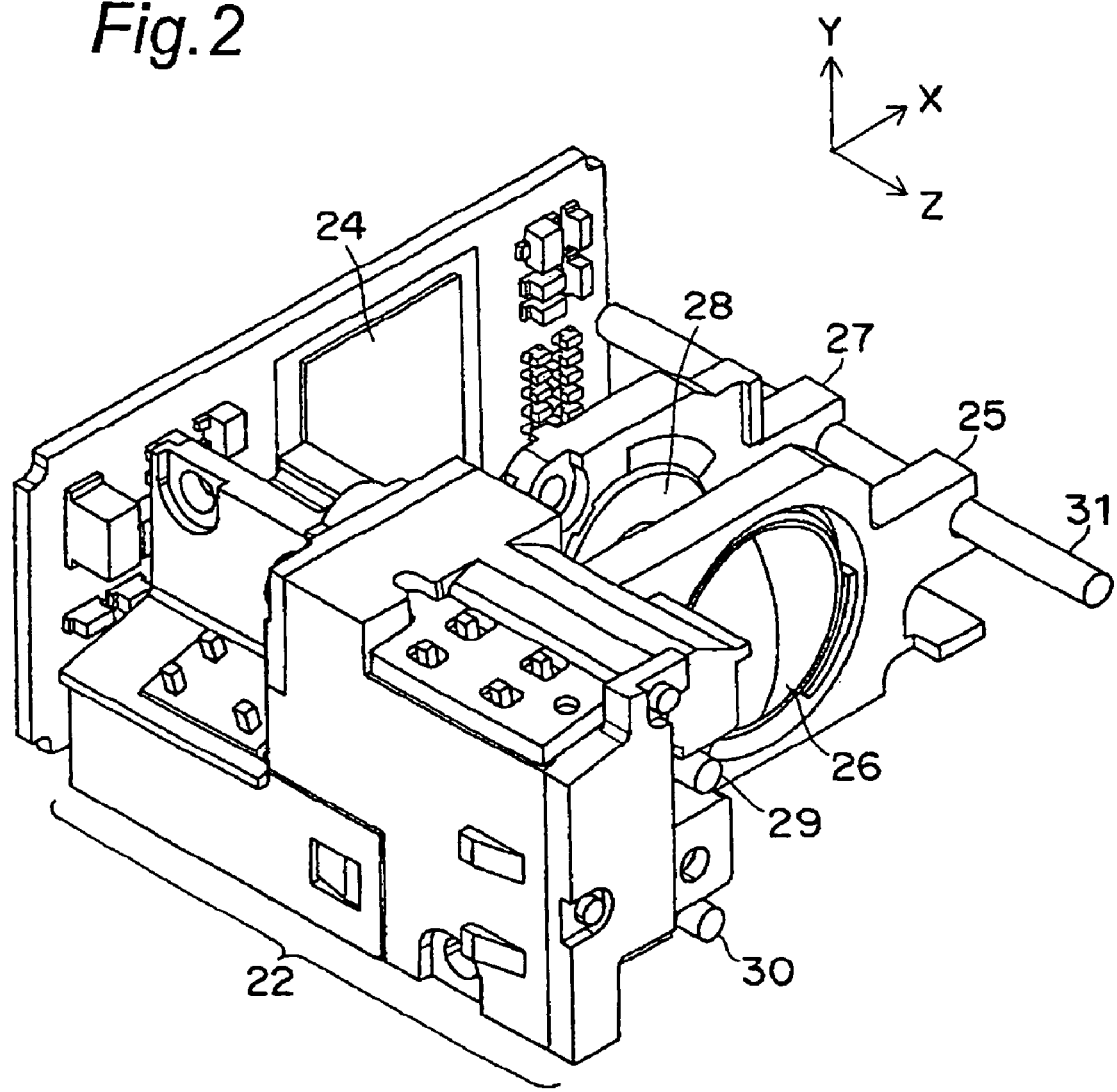
FIG. 2 shows the image pickup device from which a shell of the optical base in FIG. 1 has been removed.

The image pickup device 21 has, as shown in FIG. 1, a lens driving device 22, an optical base 23 on which the lens driving device 22 is mounted, and an image sensor 24 attached to the optical base 23. The housing of the lens driving device 22 and the shell of the optical base 23 are made of rigid resin. FIG. 2 shows the image pickup device 21 of FIG. 1 from which the shell of the optical base 23 has been removed. In FIG. 2, the lens driving device 22, the components contained in the optical base 23, and the image sensor 24 are in sight. A lens fixed to the optical base is omitted from FIG. 2. The direction of the optical axis is set as the Z-axis direction, and X-axis and Y-axis are defined on a plane parallel to the image pickup plane. The image pickup plane is a plane on the image sensor 24.

In FIG. 2, the reference numeral 25 denotes a focus lens holder which supports a set of focus lens elements 26. The reference numeral 27 denotes a zoom lens holder which supports a set of zoom lens elements 28. The focus lens guide shaft 29 extending in the direction of Z-axis penetrates the focus lens holder 25, which is guided in the direction of Z-axis along the focus lens guide shaft 29. Likewise, the zoom lens guide shaft 30 penetrates the zoom lens holder 27, which is guided in the direction of Z-axis along the zoom lens guide shaft 30. Furthermore, the guide shaft 31 is fitted in the fitting groove of the focus lens holder 25 and in the fitting groove of the zoom lens holder 27 to prevent the focus lens holder 25 and the zoom lens holder 27 from rotating in the XY plane. The lens driving device 22 drives the focus lens holder 25 and the zoom lens holder 27 in the direction of Z-axis.

Figure 3:
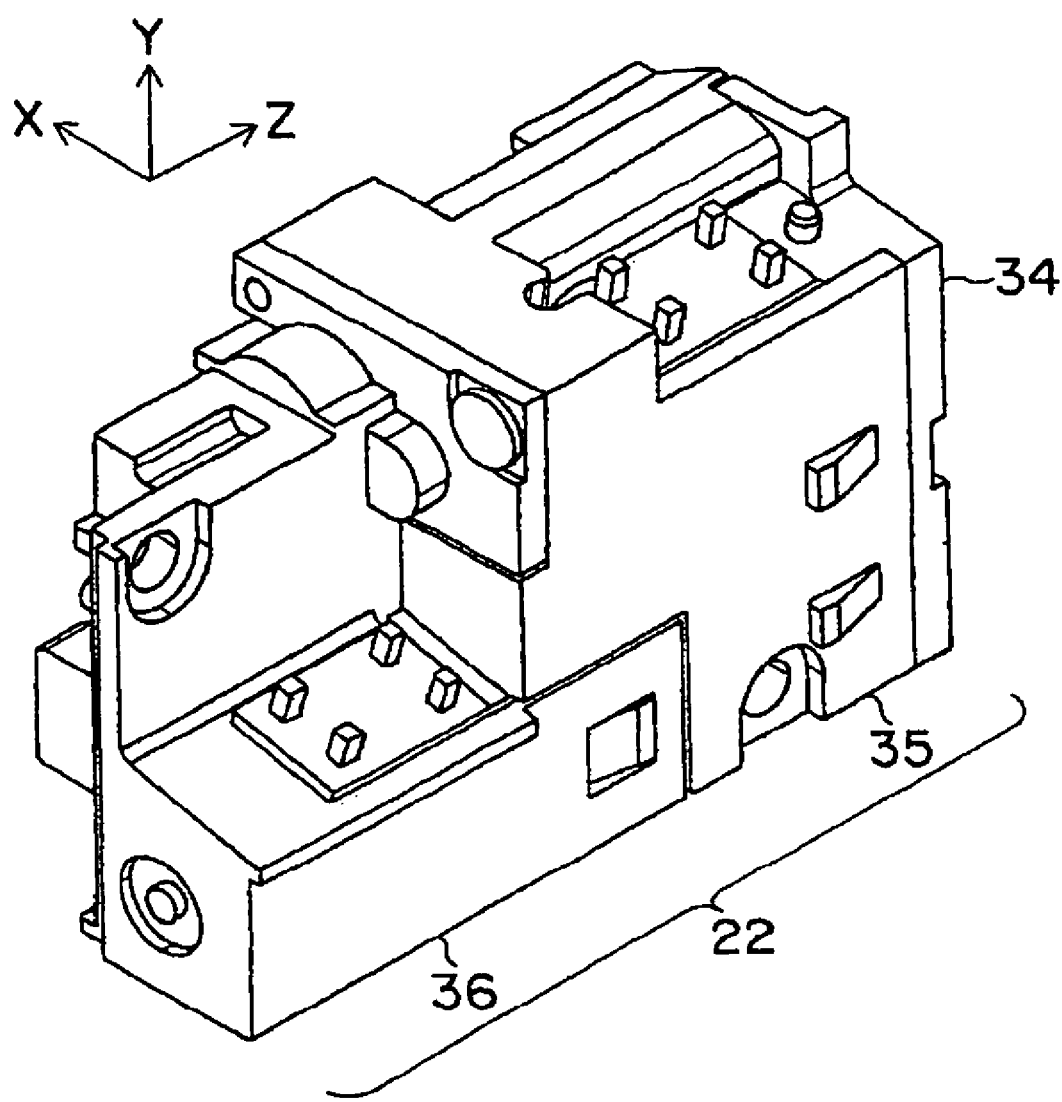
FIG. 3 is a perspective view of the lens driving device viewed from a different direction from that in FIG. 1.
Figure 4:
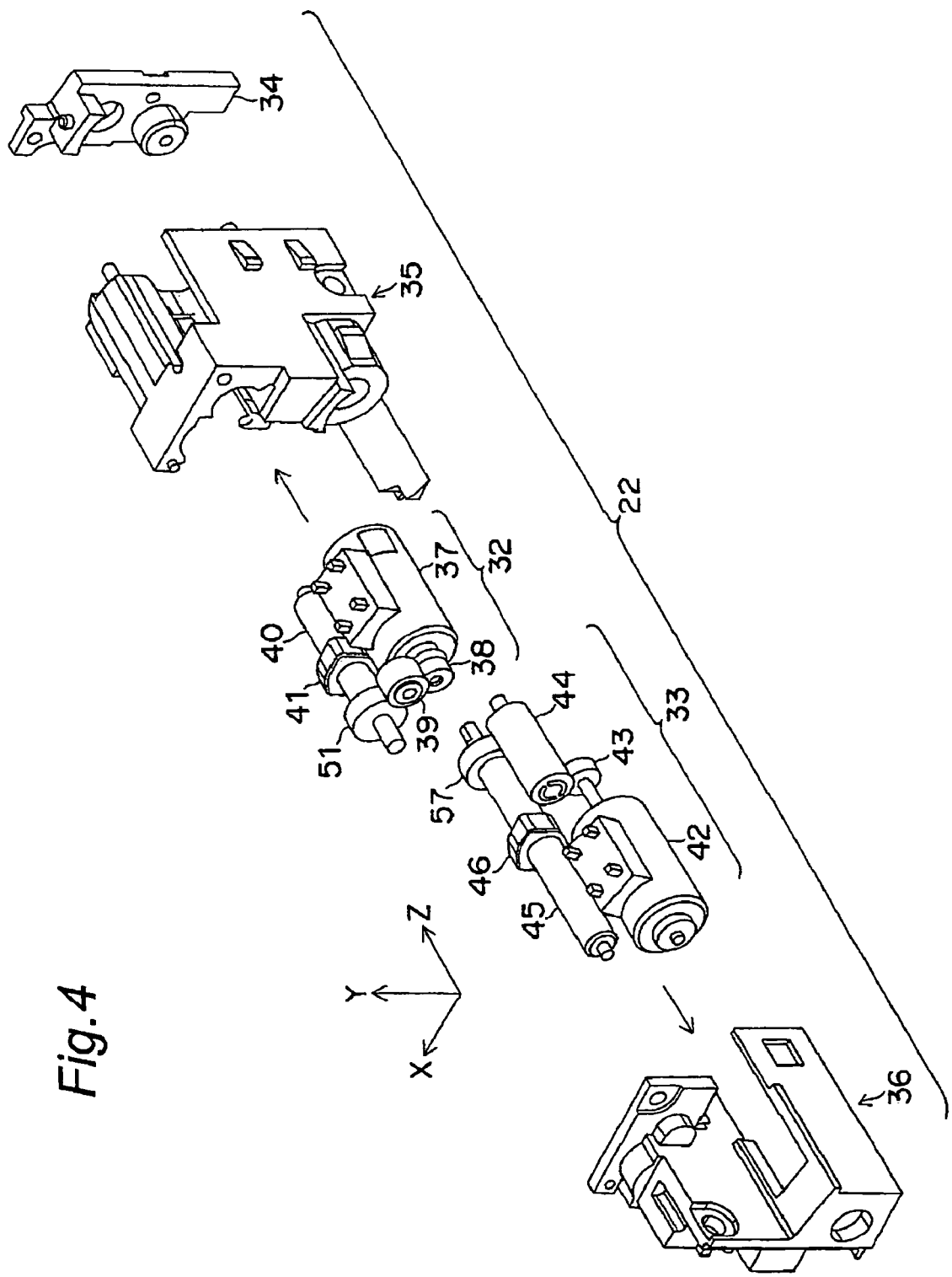
FIG. 4 is an exploded view of the lens driving device shown in FIG. 3.

FIG. 3 is a perspective view of the lens driving device 22 viewed from a different direction from that of FIG. 1 or 2. FIG. 4 is an exploded view of the lens driving device 22 shown in FIG. 3. Referring to FIGS. 3 and 4, the lens driving device 22 has a focus driving unit 32 for driving the focus lens holder 25 in the direction of Z-axis, a zoom driving unit 33 for driving the zoom lens holder 27 in the direction of Z-axis, a focus driving unit retainer 34, a focus driving unit receiver 35, and a zoom driving unit receiver 36. The focus driving unit retainer 34, the focus driving unit receiver 35, and the zoom driving unit receiver 36 are made of rigid resin, and constitute the housing of the lens driving device 22. The outline of the lens driving device 22 is shaped, as shown in FIG. 3, based on rectangular parallelepipeds having sides parallel to X-axis, Y-axis, and Z-axis.

The zoom driving unit 33 and the focus driving unit 32 are inserted in the zoom driving unit receiver 36 and the focus driving unit receiver 35 in the direction of Z-axis and are fixed to them. The focus driving unit retainer 34, the focus driving unit receiver 35, and the zoom driving unit receiver 36 are coupled to each other with screws or adhesive to form the lens driving device 22 as shown in FIG. 3.

Figure 5:
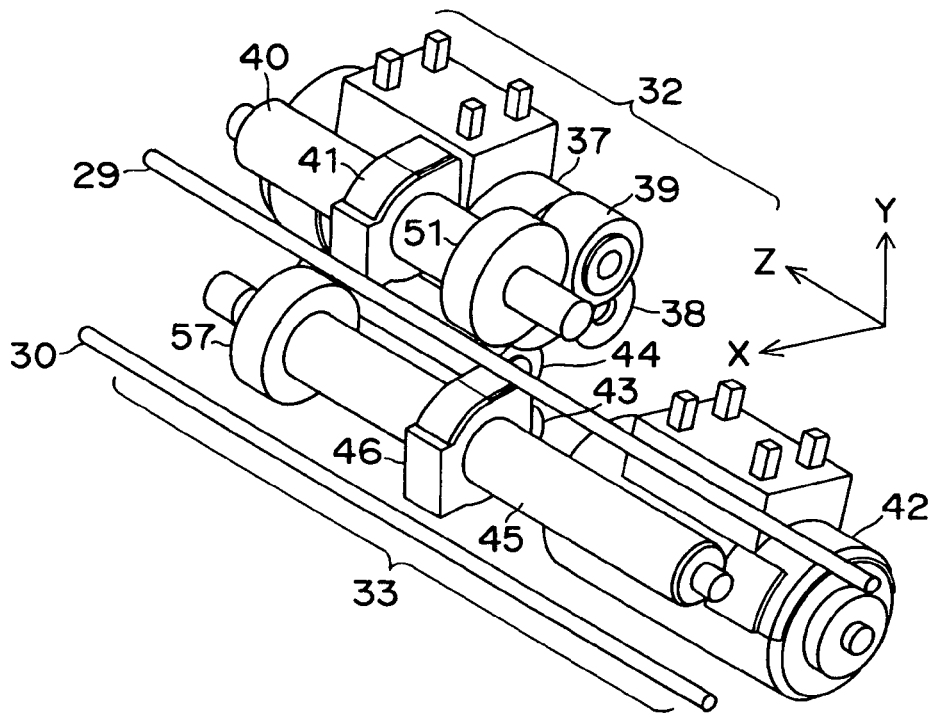
FIG. 5 is a perspective view of a zoom driving unit and a focus driving unit of the lens driving device shown in FIG. 2.

FIG. 5 is a perspective view of the zoom driving unit 3 and the focus driving unit 32 in the state that the focus driving unit retainer 34, the focus driving unit receiver 35 and the zoom driving unit receiver 36 are removed from the lens driving device 22. The focus driving unit 32 includes a first motor 37, a first pinion gear 38, a first idle gear 39, a first lead screw 40, and a first nut 41. The zoom driving unit 33 includes a second motor 42, a second pinion gear 43, a second idle gear 44, a second lead screw 45, and a second nut 46. In FIGS. 4 and 5, screw threads of the first lead screw 40 and the second lead screw 45 and teeth of each of the gears are omitted. The threads and teeth are omitted also in the other figures.

Figure 6:
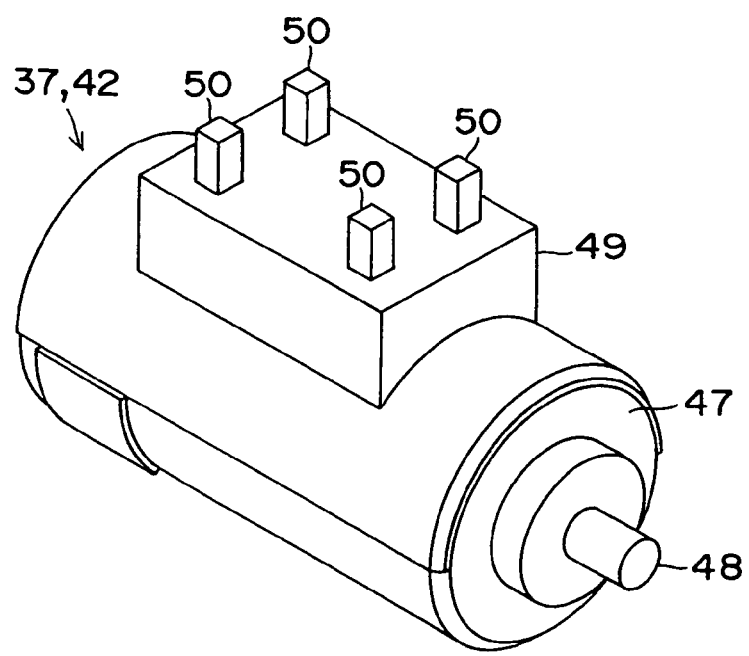
FIG. 6 is an exterior view of a first/second motor.

FIG. 6 is an exterior view of the first motor 37 or second motor 42. Since the first motor 37 and the second motor 42 are completely identical in configuration, the first motor 37 and the second motor 42 will be described below using the same figure (FIG. 6). Each of the first motor 37 and the second motor 42 is a so-called stepping motor, and an output shaft 48 of it protrudes from an end face 47 of the motor case. Furthermore, a terminal base 49 is provided on part of the cylindrical periphery, and terminals 50 protrude from the terminal base 49 in a direction perpendicular to the direction in which the output shaft 48 extends.

The first motor 37 for the focus driving unit 32 is disposed in such a manner that its output shaft 48 protrudes in the direction of Z-axis toward the image pickup plane. In contrast to this, the second motor 42 for the zoom driving unit 33 is disposed in such a manner that its output shaft 48 protrudes in the direction of Z-axis toward the subject side so as to overlap the output shaft 48 of the first motor 37 in the direction of Z-axis. Like this, the first motor 37 and the second motor 42 are disposed with their output shafts overlapping each other in the direction of Z-axis, so that it becomes possible to reduce the length of the lens driving device 22 in the direction of Z-axis by the length of the output shaft 48.

Furthermore, the first motor 37 is disposed to be as close to the second motor 42 as possible in order to reduce the length of the image pickup device 21. In addition, the end face 47 of the motor case of the first motor 37 is positioned more to the image pickup plane side than the zoom lens holder 27 in a state in which the zoom lens holder 27 has been moved most to the subject side. Furthermore, the top faces of the terminal bases 49 of the first motor 37 and second motor 42 are inclined about 10 degrees counterclockwise relative to the XZ-plane, namely toward outside in short (see FIG. 2), when viewed toward the image pickup plane in the direction of Z-axis. Because of this, since the terminals 50 protrude in the same direction, handling of FPCs (flexible printed circuit boards), etc. becomes easy, whereby assemblability is improved. Furthermore, size reduction in the lens driving device 22 itself becomes possible.

The first lead screw 40 is disposed near the focus lens guide shaft 29 with respect to the direction of Y-axis and in parallel with the Z-axis and is capable of rotating around its own center axis. A gear 51 is fitted coaxially to an image pickup plane side end portion of the first lead screw 40 such that the gear 51 rotates together with the first lead screw 40. The length of the first lead screw 40 is nearly equal to the length of the first motor 37 in the direction of the optical axis. The first nut 41 is fitted around the first lead screw 40 and is capable of moving in the direction of the optical axis (Z-axis) as the first lead screw 40 rotates. Furthermore, the first nut 41 is capable of coming into contact with the focus lens holder 25 to move the focus lens holder 25 in the direction of Z-axis.

Figure 7:
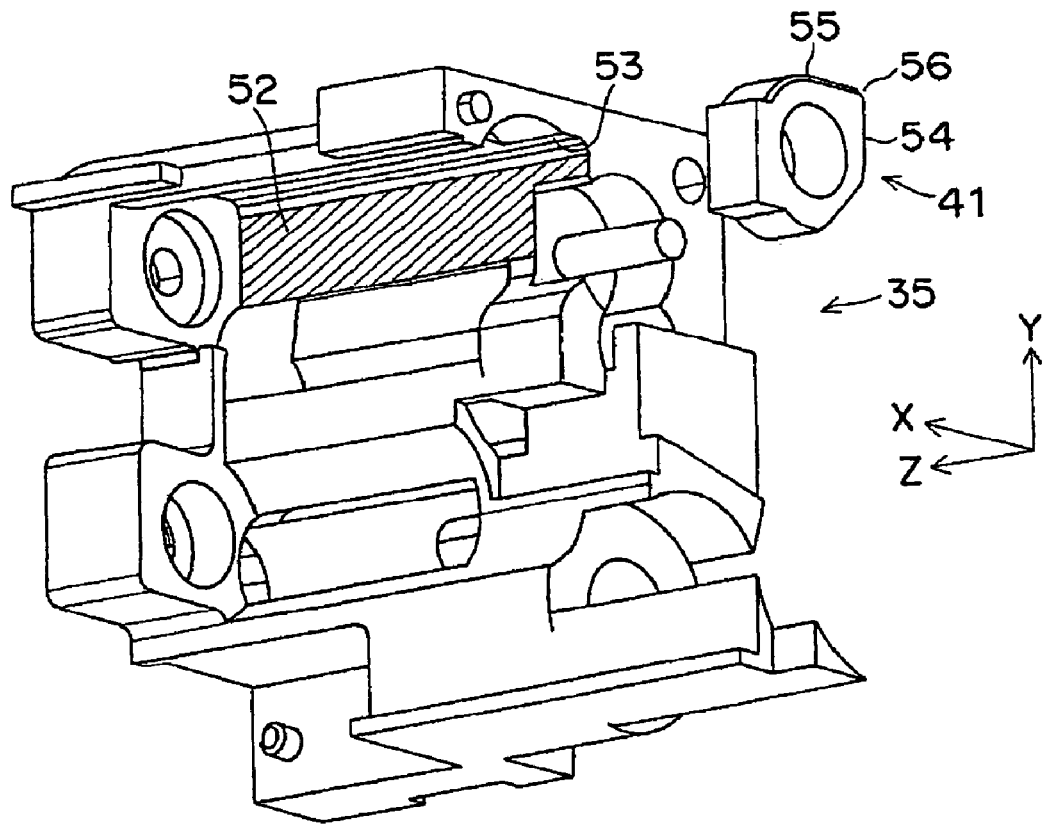
FIG. 7 illustrates the operation of a first nut in FIG. 5.
Figure 8:
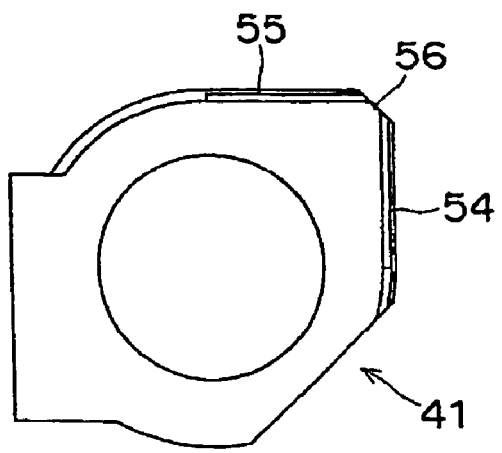
FIG. 8 is a front view of the first nut.

FIG. 7 illustrates the operation of the first nut 41. FIG. 8 is a front view of the first nut 41. In FIG. 7, the focus driving unit receiver 35 and the first nut 41 are illustrated separately, and other components are omitted, for easy understanding. In FIG. 7, the focus driving unit receiver 35 is provided with a first surface 52 (shown with hatching to make it easily visible) extending in the direction of Z-axis and in parallel with the ZY-plane, and a second surface 53 extending in the direction of Z-axis and perpendicularly to the first surface 52 (i.e. in parallel with the ZX-plane), around the first lead screw 40 (omitted in FIG. 7) disposed in the focus driving unit receiver 35. On the other hand, as shown in FIG. 8, the first nut 41 has, on its periphery, a face 54 which makes sliding contact with the first surface 52 of the focus driving unit receiver 35, and a face 55 which makes sliding contact with the second surface 53 of the focus driving unit receiver 35, and the face 54 and the face 55 meet together to form a first protrusion 56. The first protrusion 56 of the first nut 41 is positioned in a corner defined between the first surface 52 and second surface 53 of the focus driving unit receiver 35 that meet each other. As a result of this, when the first lead screw 40 rotates, the first protrusion 56 of the first nut 41 rests against the first surface 52 or second surface 53 of the focus driving unit receiver 35, so that the rotation of the first nut 41 is stopped. Thus, with the rotation of the first lead screw 40, the first nut 41 moves in the direction of Z-axis, guided by the first surface 52 and the second surface 53.

As shown in FIG. 5, the first pinion gear 38 is coaxially fitted around the output shaft 48 of the first motor 37, and rotates along with the output shaft 48. The first idle gear 39 is disposed so as to mesh with both of the first pinion gear 38 and the gear 51 of the first lead screw 40. The first idle gear 39 is positioned apart from the first lead screw 40 in a direction perpendicular to the optical axis and is attached rotatably to a shaft provided in the zoom driving unit receiver 36.

The second lead screw 45 is disposed in substantially parallel with the first lead screw 40 and between a plane that is parallel with the XZ-plane and includes the focus lens guide shaft 29 and a plane that is parallel with the XZ-plane and includes the zoom lens guide shaft 30. The second lead screw 45 is capable of rotating around its own center axis. A gear 57 is coaxially fitted around a subject side end portion of the second lead screw 45 such that the gear 57 rotates together with the second lead screw 45. The second nut 46 is fitted around the second lead screw 45 and is capable of moving in the direction of the optical axis (Z-axis) as the second lead screw 45 rotates. Furthermore, the second nut 46 is capable of coming into contact with the zoom lens holder 27 to move the zoom lens holder 27 in the direction of Z-axis.

Figure 9:
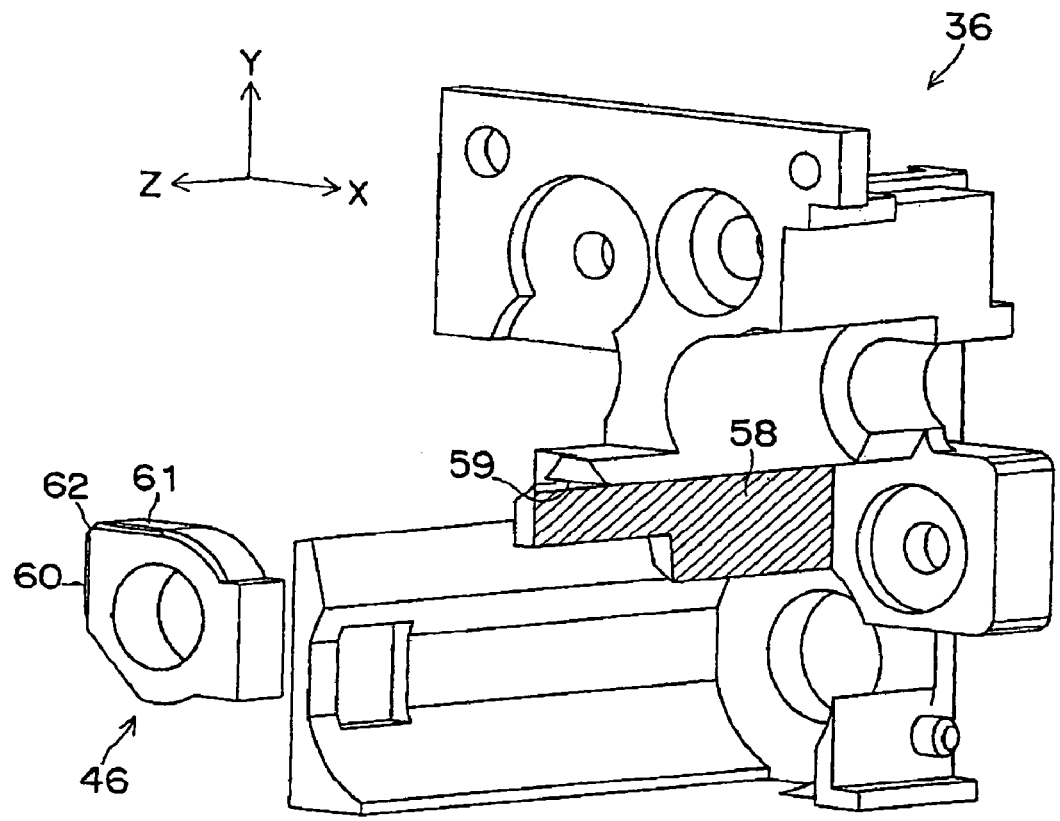
FIG. 9 illustrates the operation of a second nut in FIG. 5.
Figure 10:
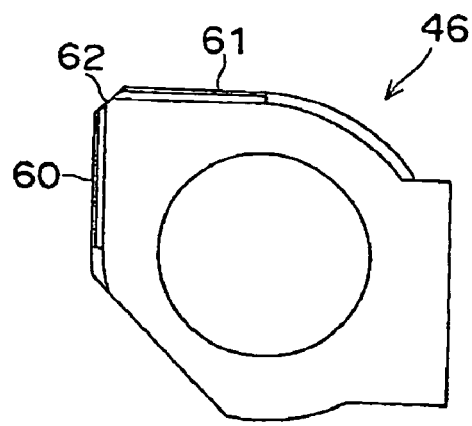
FIG. 10 is a front view of the second nut.

FIG. 9 illustrates the operation of the second nut 46. FIG. 10 is a front view of the second nut 46. In FIG. 9, the zoom driving unit receiver 36 and the second nut 46 are illustrated separately, and other components are omitted, for easy understanding. In FIG. 9, the zoom driving unit receiver 36 is provided with a third surface 58 (shown with hatching to make it easily visible) extending in the direction of Z-axis and in parallel with the ZY-plane, and a fourth surface 59 extending in the direction of Z-axis and perpendicularly to the third surface 58 (i.e. in parallel with the ZX-plane), around the second lead screw 45 (omitted in FIG. 9) disposed in the zoom driving unit receiver 36. On the other hand, as shown in FIG. 10, the second nut 46 has, on its periphery, a face 60 which makes sliding contact with the third surface 58 of the zoom driving unit receiver 36, and a face 61 which makes sliding contact with the fourth surface 59 of the zoom driving unit receiver 36, and the face 60 and the face 61 meet together to form a second protrusion 62. The second protrusion 62 of the second nut 46 is positioned in a corner defined between the third surface 58 and fourth surface 59 of the zoom driving unit receiver 36 that meet together. As a result of this, when the second lead screw 45 rotates, the second protrusion 62 of the second nut 46 rests against the third surface 58 or fourth surface 59 of the zoom driving unit receiver 36, so that the rotation of the second nut 46 is stopped. Thus, with the rotation of the second lead screw 45, the second nut 46 moves in the direction of Z-axis, guided by the third surface 58 and the fourth surface 59.

Thus, the first nut 41 is able to move the focus lens holder 25 in the direction of Z-axis. Also, the second nut 46 is able to move the zoom lens holder 27 in the direction of Z-axis.

As shown in FIG. 5, the second pinion gear 43 is coaxially fitted around the output shaft 48 of the second motor 42, and rotates along with the output shaft 48. The second idle gear 44 is disposed so as to mesh with both of the second pinion gear 43 and the gear 57 of the second lead screw 45. Furthermore, the second idle gear 44 has, on its subject side end portion, a projection (not shown) which projects in the direction of the optical axis, and on its image pickup plane side end portion, the second idle gear 44 has a pit (not shown) which is parallel with the direction of the optical axis. The projection of the second idle gear 44 is received in a pit (not shown) provided in the focus driving unit receiver 35. On the other hand, the pit of the second idle gear 44 receives an axis provided in the zoom driving unit receiver 36. In this manner, the second idle gear 44 is held rotatably by the focus driving unit receiver 35 and the zoom driving unit receiver 36.

Figure 11:
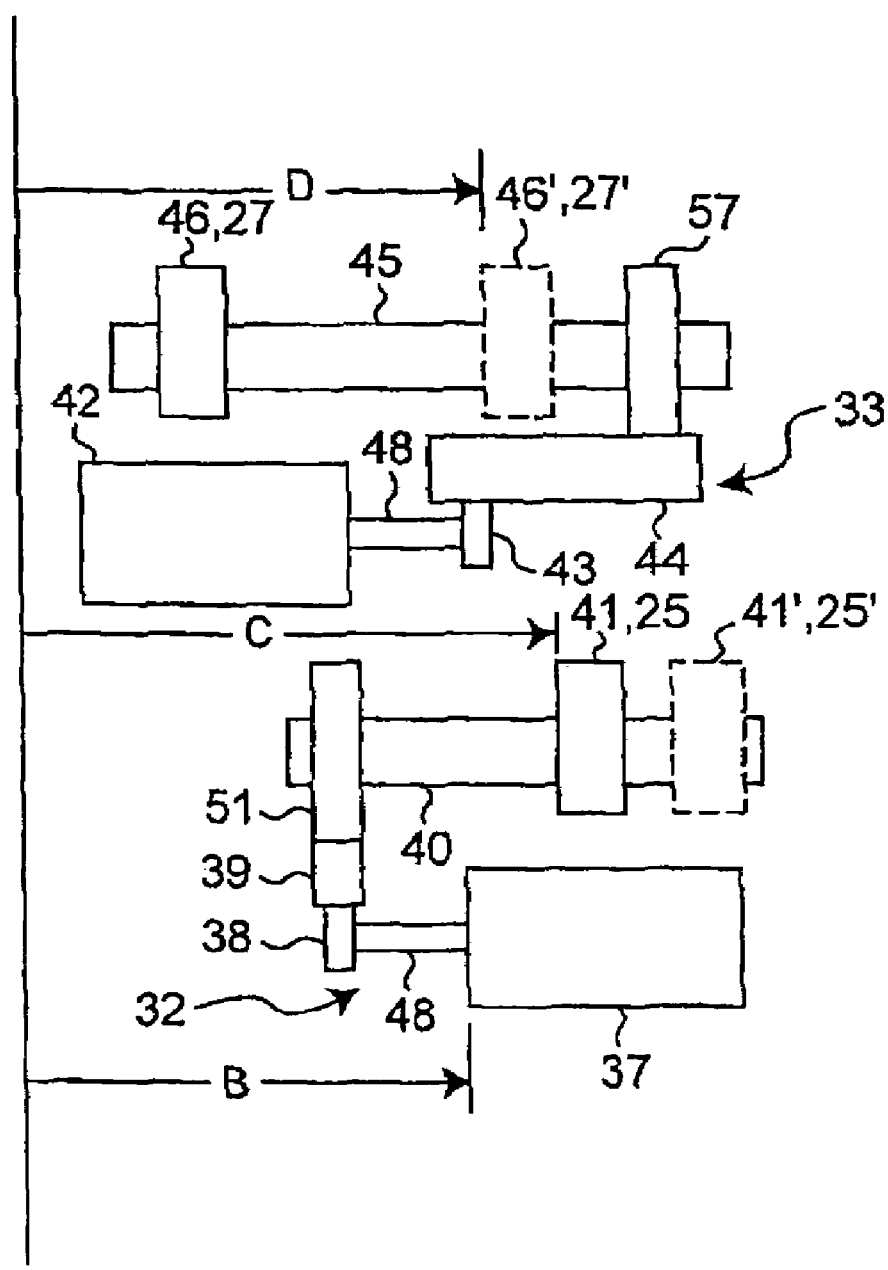
FIG. 11 is a schematic diagram showing the positional relationship between components of the focus driving unit and the zoom driving unit.

FIG. 11 is a schematic diagram showing the positional relationship between components of the focus driving unit 32 and the zoom driving unit 33. In FIG. 11, the focus lens holder 25 supporting the set of focus lens elements 26 (see FIG. 2) on the subject side is driven to move in the direction of the optical axis by the focus driving unit 32, while the zoom lens holder 27 supporting the set of zoom lens elements 28 (see FIG. 2) on the image pickup plane side is driven to move in the direction of the optical axis by the zoom driving unit 33.

The first motor 37, which is a component of the focus driving unit 32, is disposed near and on a lateral side of the focus lens holder 25. The output shaft 48 of the first motor 37 is disposed in parallel with the optical axis, and fitted with the first pinion gear 38. On the other hand, the second motor 42, which is a component of the zoom driving unit 33, is disposed near and on a lateral side of the zoom lens holder 27. The output shaft 48 of the second motor 42 is disposed in parallel with the optical axis, and fitted with the second pinion gear 43. The output shaft 48 of the first motor 37 and the output shaft 48 of the second motor 42 overlap each other in the axis direction.

Furthermore, the focus lens holder 25 is moved in the direction of the optical axis on a lateral side of the first motor 37 by the first nut 41 which is fitted around the first lead screw 40 to which the gear 51 rotated by the first pinion gear 38 is coaxially fitted. Thus, the image pickup plane side end face of the motor case of the first motor 37 in the focus driving unit 32 is able to be positioned to the image pickup plane side to a larger extent than the focus lens holder 25 in its position most to the image pickup plane side is.

The zoom lens holder 27 is moved in the direction of the optical axis on a lateral side of the second motor 42 by the second nut 46 which is fitted around the second lead screw 45 to which the gear 57 rotated by the second pinion gear 43 is coaxially fitted. In addition, the second idle gear 44 which meshes with both of the second opinion gear 43 and the gear 57 extends close to the subject side end face of the motor case of the first motor 37 in parallel with the optical axis. Thus, the image pickup plane side end face of the motor case of the first motor 37 is able to be positioned to the image pickup plane side to a larger extent than the zoom lens holder 27 that assumes its position 27' most to the subject side.

As is apparent from the above, in this embodiment, the distance B from the image pickup plane to the image pickup plane side end face of the motor case of the first motor 37, which is a component of the focus driving unit 32 on the subject side, is smaller than the distance C from the image pickup plane to the focus lens holder 25 when the latter is positioned most to the image pickup plane side. Furthermore, the distance B is smaller than the distance D from the image pickup plane to the zoom lens holder 27' positioned most to the subject side. Consequently, size reduction in the image pickup device 21 can be achieved in such a way that the focus driving unit 32 on the subject side is disposed more to the image pickup plane side to reduce the length of the lens driving device 22 in the direction of the optical axis.

Furthermore, as shown in FIG. 5, the focus driving unit 32 is disposed to the subject side more than the second motor 42 is. In addition, parts of the zoom driving unit 33 other than the second motor 42 are disposed on the subject side of the second motor 42 and on a lateral side of the second motor 42. Thus, there is no component of the focus driving unit 32 and zoom driving unit 33 above the second motor 42 positioned on the image pickup plane side. Because of this, as shown in FIG. 1, a space 65 can be provided above the second motor 42. That is, according to this embodiment, parts which are long in the direction of Z-axis like a chip 67 can be disposed on the substrate 66 on which the image sensor 24 is mounted, whereby the length of the image pickup device 21 can be reduced. In addition, heat generated by the image sensor 24 can be dissipated through the space 65.

Furthermore, according to this embodiment, spaces can be provided above the first motor 37 and the second motor 42 as described above. For this reason, as shown in FIG. 2, spaces can be provided around the terminals 50 of the first motor 37 and second motor 42. Thus, wiring to the terminals 50 becomes easy, thereby improving the assemblability.

Figure 12A:
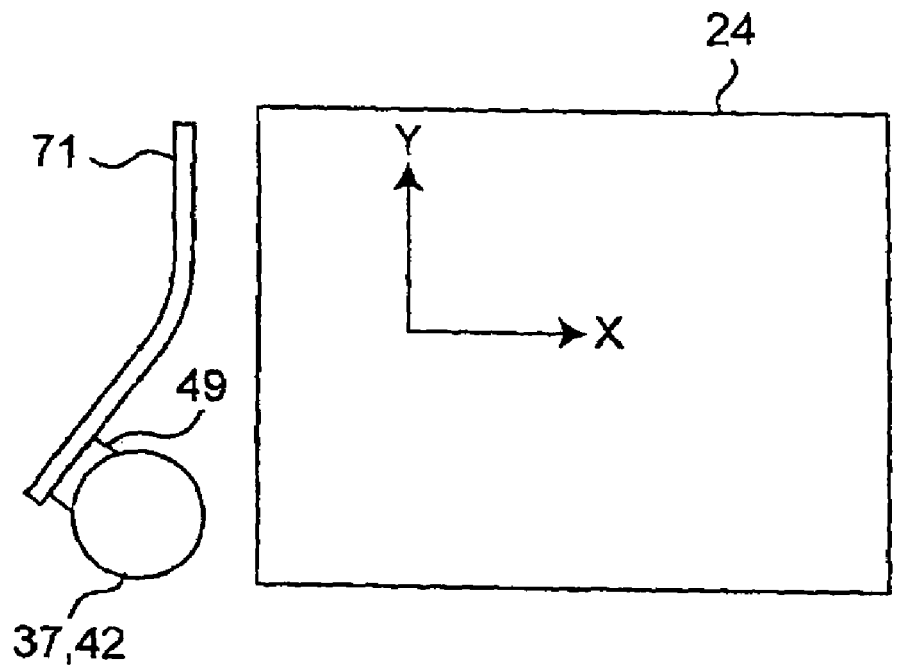
FIGS. 12A and 12B illustrate that the bending stress of a FPC is reduced.
Figure 12B:
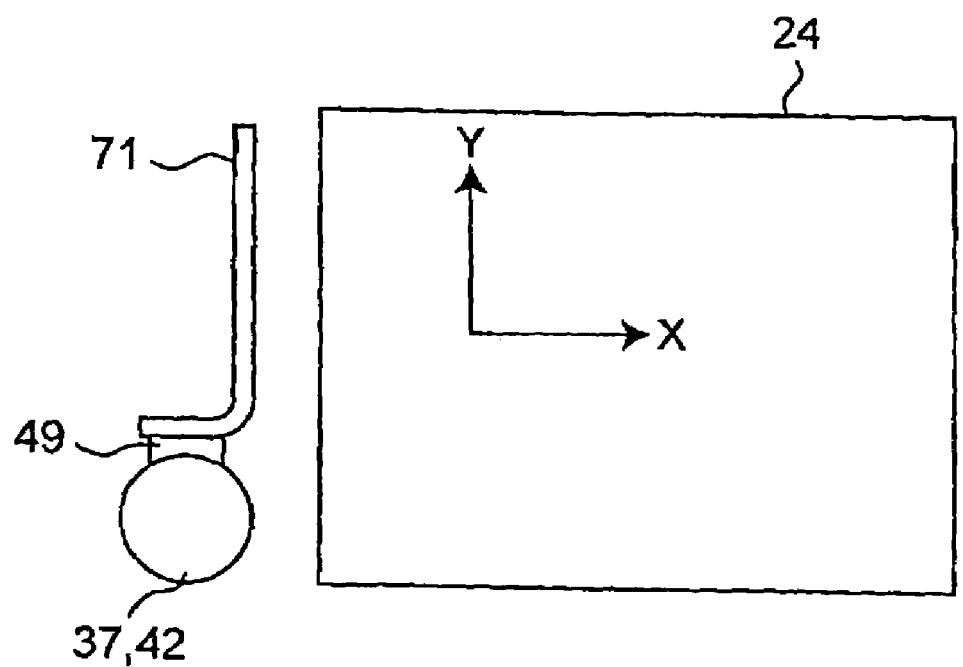

Furthermore, according to this embodiment, as shown in FIG. 2, the top faces of the terminal bases of the first motor 37 and second motor 42 extend in the direction of the optical axis (Z-axis) and are inclined about 10 degrees toward the outside from the optical axis (Z-axis) side. Thus, wiring from the terminals 50 becomes easy. In particular, as shown in FIG. 12A, when a FPC 71 is inserted downward in the direction of Y-axis, the degree of bend of the FPC 71 connected to the terminals 50 becomes larger than 90 degrees. Thus, as shown in FIG. 12B, the bending stress of the FPC 71 in this case can be made smaller than that in the case that the top face of the terminal base 49 is not inclined (in which case the bending angle of the FPC 71 is 90 degrees), thereby improving the assemblability and the long term reliability.

Figure 13A:
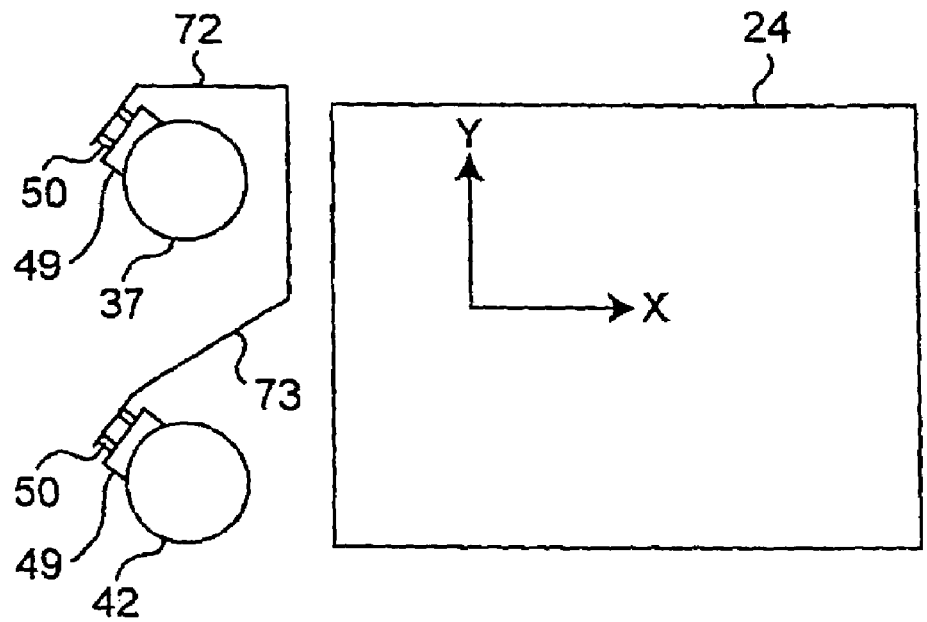
FIGS. 13A and 13B illustrate that the length of wiring in the case that the terminals of two motors are directed in the same direction is shorter than that in the case that they are not directed in the same direction.
Figure 13B:
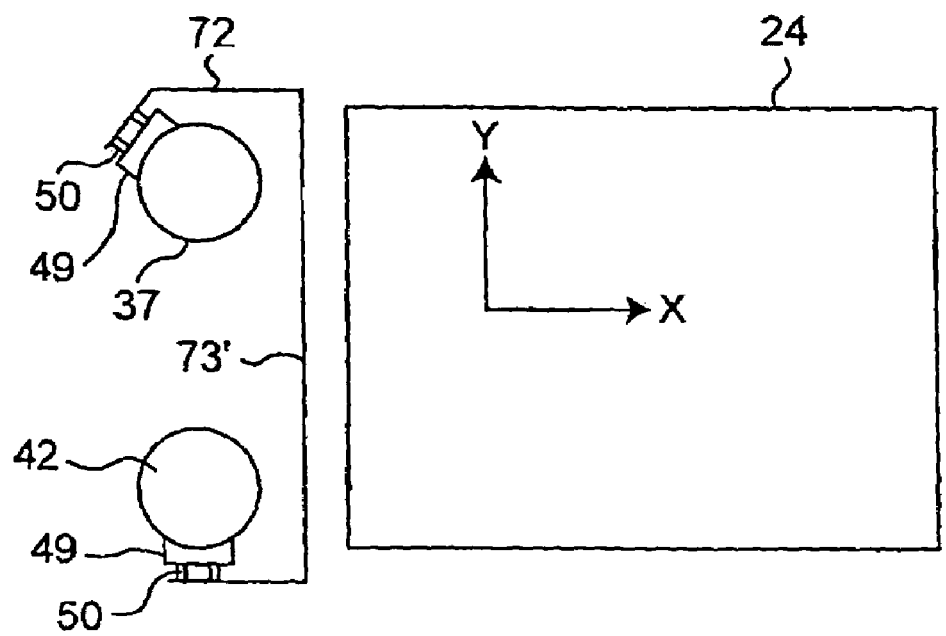
Figure 14:
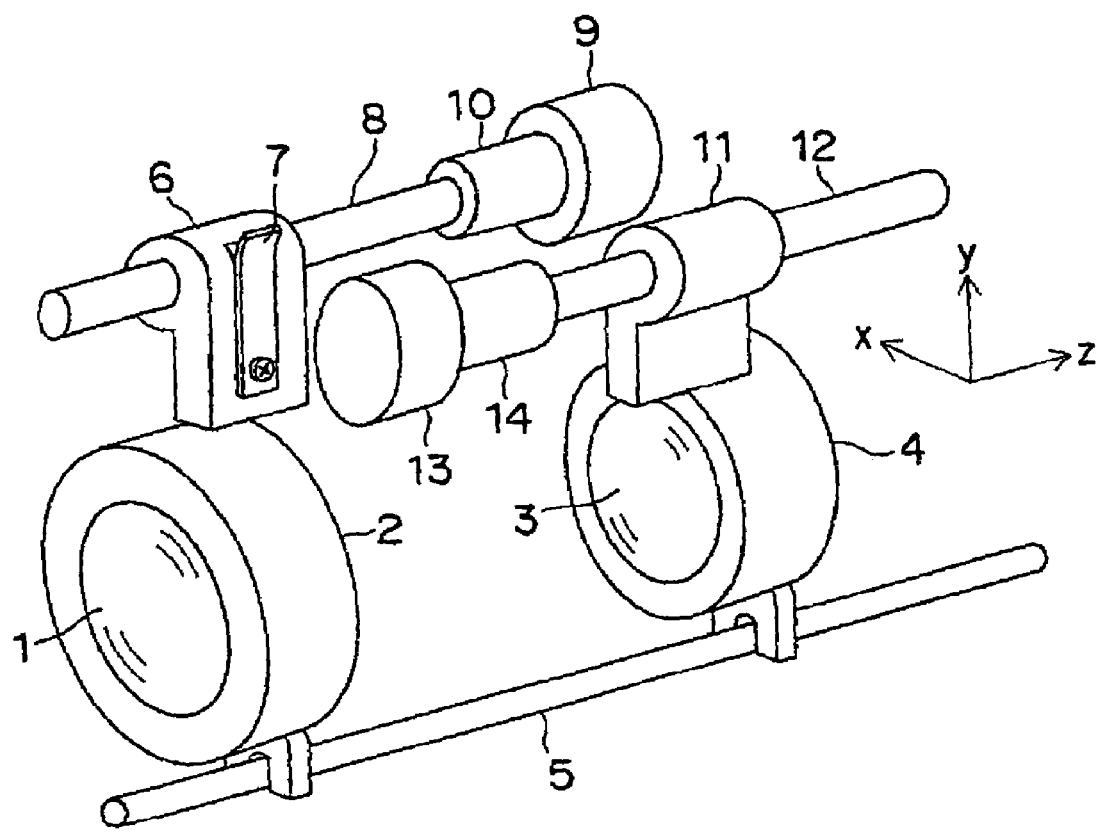
FIG. 14 is a perspective view of a conventional lens driving mechanism for driving two sets of lens elements.
Figure 15:
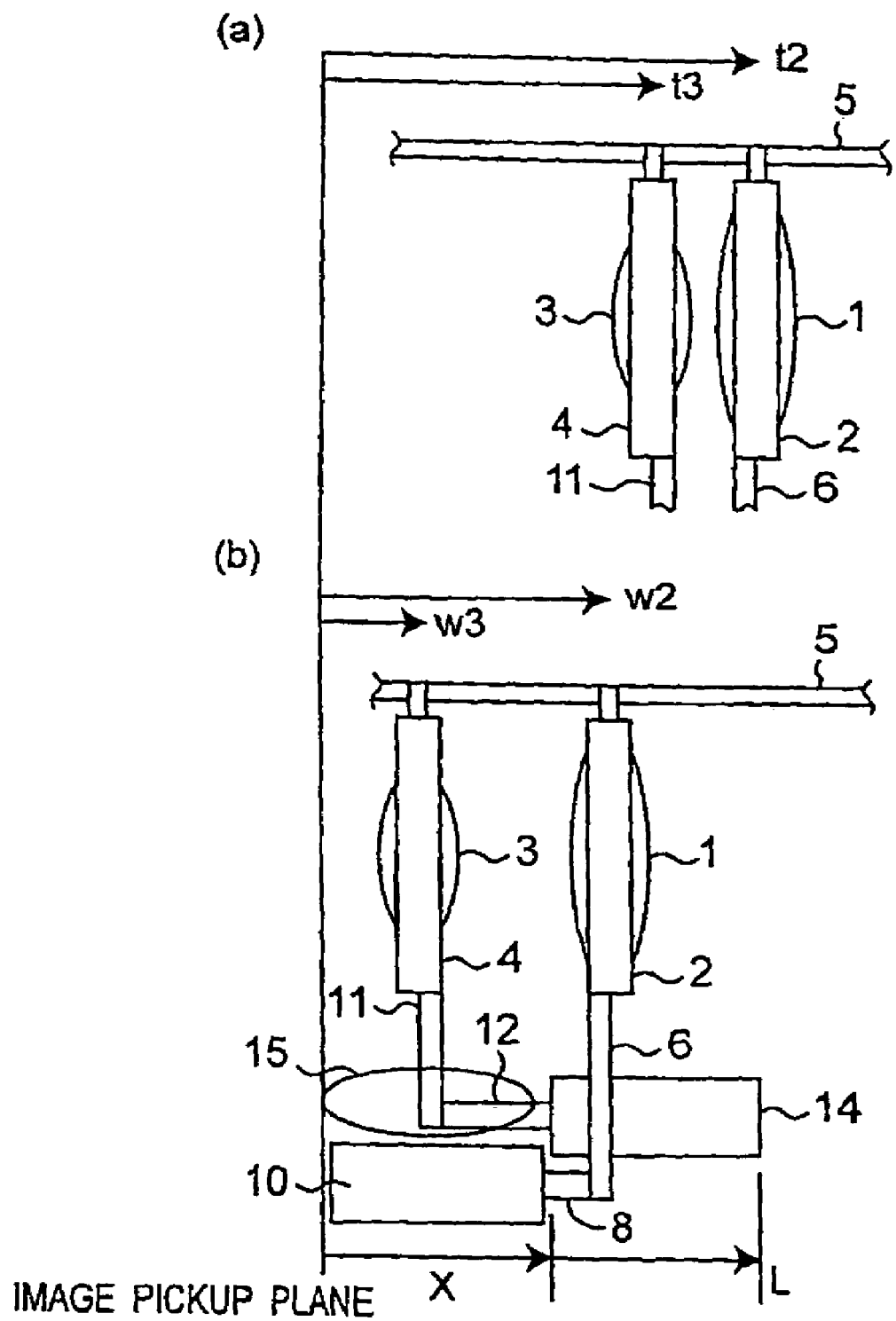
FIG. 15 is a schematic diagram showing the arrangement of the driving systems of the conventional lens driving mechanism shown in FIG. 14.

Furthermore, in this embodiment, the terminals 50 of the terminal bases 49 of the first motor 37 and second motor 42 are directed in the same direction. Because of this, as shown in FIG. 13A, when a FPC 72 for the first motor 37 and a FPC 73 for the second motor 42 are inserted downward in the direction of Y-axis, a necessary length of the FPC 73 connected to the terminals 50 of the second motor 42 can be made shorter, as compared with the case that the terminals 50 of both of the terminals bases 49 are directed in different directions as shown in FIG. 13B (i.e., the length of the FPC 73<the length of the FPC 73'). In addition, since the terminals of both of the terminal bases 49 are directed in the same direction, wirings from the same direction are possible. Thus, the assemblability and the workability are improved.

In short, according to this embodiment, as described above, circuit components can be easily placed on the substrate 66 of the image sensor 24, so that the length of the image pickup device 21 in the direction of the optical axis can be reduced.

In addition, heat generated by the image sensor 24, the first motor 37, or the second motor 42 can be dissipated, thereby increasing the flexibility in the design of equipment to be mounted.

In the aforementioned embodiment, the output shaft 48 of the first motor 37 and the output shaft 48 of the second motor 42 fully overlap each other. However, an embodiment in which the output shafts 48 partially overlap each other is also included in the scope of this invention.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A lens driving device, comprising:
a first lens holder for supporting a first set of lens elements;
a second lens holder for supporting a second set of lens elements which is disposed in a direction of an optical axis of the first set of lens elements and is positioned more to an image pickup plane side than the first set of lens elements is;
a first driving unit for driving the first lens holder in the direction of the optical axis; and
a second driving unit for driving the second lens holder in the direction of the optical axis, wherein
the first driving unit comprises:
a first motor disposed on a lateral side of the first set of lens elements and having an output shaft disposed in parallel with the optical axis of the first set of lens elements;
a first gear fitted around the output shaft of the first motor;
a first lead screw rotated by the first gear; and
a first nut which is fitted around the first lead screw and is movable in the direction of the optical axis,
the second driving unit comprises:
a second motor disposed on a lateral side of the second set of lens elements, the first motor and the second motor being disposed on the same lateral side with respect to the first set and second set of lens elements, and the second motor having an output shaft disposed in parallel with the optical axis of the first set of lens elements;
a second gear fitted around the output shaft of the second motor;
a second lead screw rotated by the second gear; and
a second nut which is fitted around the second lead screw and is movable in the direction of the optical axis,
the output shaft of the first motor and the output shaft of the second motor overlap each other at least partially in an axial direction of the output shafts,
the first driving unit moves the first lens holder in the direction of the optical axis via the first nut moving in the direction of the optical axis,
the second driving unit moves the second lens holder in the direction of the optical axis via the second nut moving in the direction of the optical axis, and
a position of an image pickup plane side end face of the first motor is more to the image pickup plane side than a position most to the subject side of the second lens holder is.

2. A lens driving device as claimed in claim 1, wherein:
the first driving unit is disposed more to a subject side than the second motor is; and parts of the second driving unit other than the second motor are disposed more to the subject side than the second motor is and on a lateral side of the second motor.

3. A lens driving device as claimed in claim 1, wherein:

the image pickup plane has a rectangular shape in outline;

the first motor and the second motor each have a terminal base which is provided with terminals for supplying electric power; and the terminal base of at least one of the first motor and the second motor has a top surface which is inclined relative to directions in which all of sides constituting the outline of the image pickup plane extend.

4. A lens driving device as claimed in claim 1, wherein:

the first motor and the second motor each have a terminal base which is provided with terminals for supplying electric power; and the terminals of the first motor and second motor extend in the same direction.

5. An image pickup device, comprising a lens driving device as claimed in claim 1.

* * * * *